(12) United States Patent
Chan et al.

(10) Patent No.: US 11,054,646 B1
(45) Date of Patent: Jul. 6, 2021

(54) HEAD-MOUNTED DISPLAY DEVICE WITH FRESNEL LENSES

(71) Applicant: Apple Inc., Cupertino, CA (US)

(72) Inventors: Victoria C. Chan, Sunnyvale, CA (US); John N. Border, Campbell, CA (US); Jeffrey C. Olson, San Francisco, CA (US); Yury A. Petrov, Half Moon Bay, CA (US); Edward S. Huo, Sunnyvale, CA (US); Brandon Clarke, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/886,623

(22) Filed: Feb. 1, 2018

Related U.S. Application Data

(60) Provisional application No. 62/504,729, filed on May 11, 2017.

(51) Int. Cl.
  *G02B 27/01* (2006.01)
  *G02B 27/09* (2006.01)
  *G06T 19/00* (2011.01)

(52) U.S. Cl.
  CPC ..... *G02B 27/0172* (2013.01); *G02B 27/0955* (2013.01); *G02B 2027/0178* (2013.01); *G06T 19/006* (2013.01)

(58) Field of Classification Search
  CPC ............ G02B 27/0172; G02B 27/0955; G02B 2027/0178
  USPC ........................................................... 345/8
  See application file for complete search history.

(56) References Cited

U.S. PATENT DOCUMENTS

| | | | |
|---|---|---|---|
| 4,391,495 A | | 7/1983 | Mazurkewitz |
| 4,770,525 A | * | 9/1988 | Umeda ............. G02F 1/133526 353/102 |
| 5,619,373 A | * | 4/1997 | Meyerhofer ....... G02B 27/0037 359/482 |
| 5,633,735 A | | 5/1997 | Hunter, Jr. et al. |
| 5,940,152 A | * | 8/1999 | Wilson ................. H04N 5/7441 345/5 |
| 7,016,116 B2 | * | 3/2006 | Dolgoff ............. G02B 27/2278 359/630 |
| 7,119,965 B1 | | 10/2006 | Rolland et al. |
| 2006/0087025 A1 | * | 4/2006 | Shimizu ........... B29D 11/00278 257/696 |

(Continued)

*Primary Examiner* — Chanh D Nguyen
*Assistant Examiner* — Ngan T. Pham-Lu
(74) *Attorney, Agent, or Firm* — Treyz Law Group, P.C.; G. Victor Treyz; Michael H. Lyons

(57) ABSTRACT

A head-mounted device may include a display system and an optical system in a housing. The display system may have displays that produce images. The optical system may have Fresnel lenses through which a user of the head-mounted device may view the images. The Fresnel lenses may have concentric rings with slope facets and draft facets angled parallel to the chief rays. Light scattering in the Fresnel lenses may be reduced by coating the draft facets with opaque masking material and/or by aligning concentric rings of the opaque masking material that are supported on a transparent substrate with the draft facets. A central portion of the Fresnel lens that is free of facets may be enlarged to reduce scattering. The Fresnel lenses may have wedge-shaped cross-sectional profiles and may have outer portions that are thicker than inner portions. Gradient-index material may be used in forming the Fresnel lenses.

10 Claims, 7 Drawing Sheets

(56) References Cited

U.S. PATENT DOCUMENTS

| | | | |
|---|---|---|---|
| 2007/0070507 A1* | 3/2007 | Yee | G02B 3/0018 |
| | | | 359/622 |
| 2007/0236800 A1 | 10/2007 | Cakmakci et al. | |
| 2007/0297051 A1* | 12/2007 | Huang | G03B 21/10 |
| | | | 359/457 |
| 2009/0097113 A1* | 4/2009 | Ansbro | G02B 27/2221 |
| | | | 359/457 |
| 2010/0238400 A1* | 9/2010 | Volk | G02C 7/061 |
| | | | 351/159.42 |
| 2011/0048411 A1* | 3/2011 | Walker | F24S 23/31 |
| | | | 126/698 |
| 2012/0120498 A1* | 5/2012 | Harrison | G06F 3/012 |
| | | | 359/630 |
| 2013/0141800 A1* | 6/2013 | Oi | G02B 3/08 |
| | | | 359/708 |
| 2014/0218810 A1* | 8/2014 | Kamiyama | G02B 3/08 |
| | | | 359/742 |
| 2014/0233101 A1* | 8/2014 | Takagi | G02F 1/29 |
| | | | 359/463 |
| 2016/0011341 A1* | 1/2016 | Smith | G02B 3/08 |
| | | | 359/743 |
| 2017/0170200 A1* | 6/2017 | Ikeda | G09G 3/2003 |
| 2018/0074320 A1* | 3/2018 | Wheelwright | G02B 27/0172 |
| 2018/0081092 A1* | 3/2018 | Hudman | G02B 25/001 |
| 2018/0143400 A1* | 5/2018 | Bone | G02B 13/0035 |
| 2019/0049721 A1* | 2/2019 | Anton | G02B 27/0081 |
| 2019/0113758 A1* | 4/2019 | Cho | G02B 30/34 |
| 2019/0171861 A1* | 6/2019 | Zhang | G06K 9/00026 |
| 2019/0210527 A1* | 7/2019 | Ji | B62D 25/04 |

* cited by examiner

HEAD-MOUNTED DISPLAY DEVICE WITH FRESNEL LENSES

This patent application claims the benefit of provisional patent application No. 62/504,729, filed on May 11, 2017, which is hereby incorporated by reference herein in its entirety.

BACKGROUND

This relates generally to optical systems and, more particularly, to optical systems for head-mounted devices.

Head-mounted devices such as virtual reality glasses and augmented reality glasses use displays to generate images. The displays may be positioned close to a user's eyes, so lenses are typically placed between the displays and the user's eyes to bring the displays into focus.

If care is not taken, lenses for head-mounted devices may be bulkier and heavier than desired and may not exhibit satisfactory optical performance. Use of a head-mounted device with such lenses could be uncomfortable and tiring.

SUMMARY

A head-mounted device may include a display system and an optical system in a housing. The head-mounted device may form a virtual reality or augmented reality device.

The display system may have displays that produce images. The displays may be either planar or curved. The optical system may have Fresnel lenses through which a user of the head-mounted device may view the images. The Fresnel lenses may have curved convex surfaces that face the displays or may be planar.

The Fresnel lenses may have concentric rings with slope facets and draft facets. Light scattering in the Fresnel lenses may be reduced to improve image contrast by coating the draft facets with opaque masking material and/or by aligning concentric rings of the opaque masking material that are supported on a transparent substrate with the draft facets.

A central dome portion of the Fresnel lens that is free of facets may be enlarged to reduce scattering. The Fresnel lenses may have wedge-shaped cross-sectional profiles with outer portions that are thicker than inner portions. Gradient-index material may be used in forming the Fresnel lenses.

DETAILED DESCRIPTION

Head-mounted devices such as head-mounted displays may be used for virtual reality and augmented reality systems. For example, a pair of virtual reality glasses or other head-mounted device that is worn on the head of a user may be used to provide a user with virtual reality content.

Figure 1:
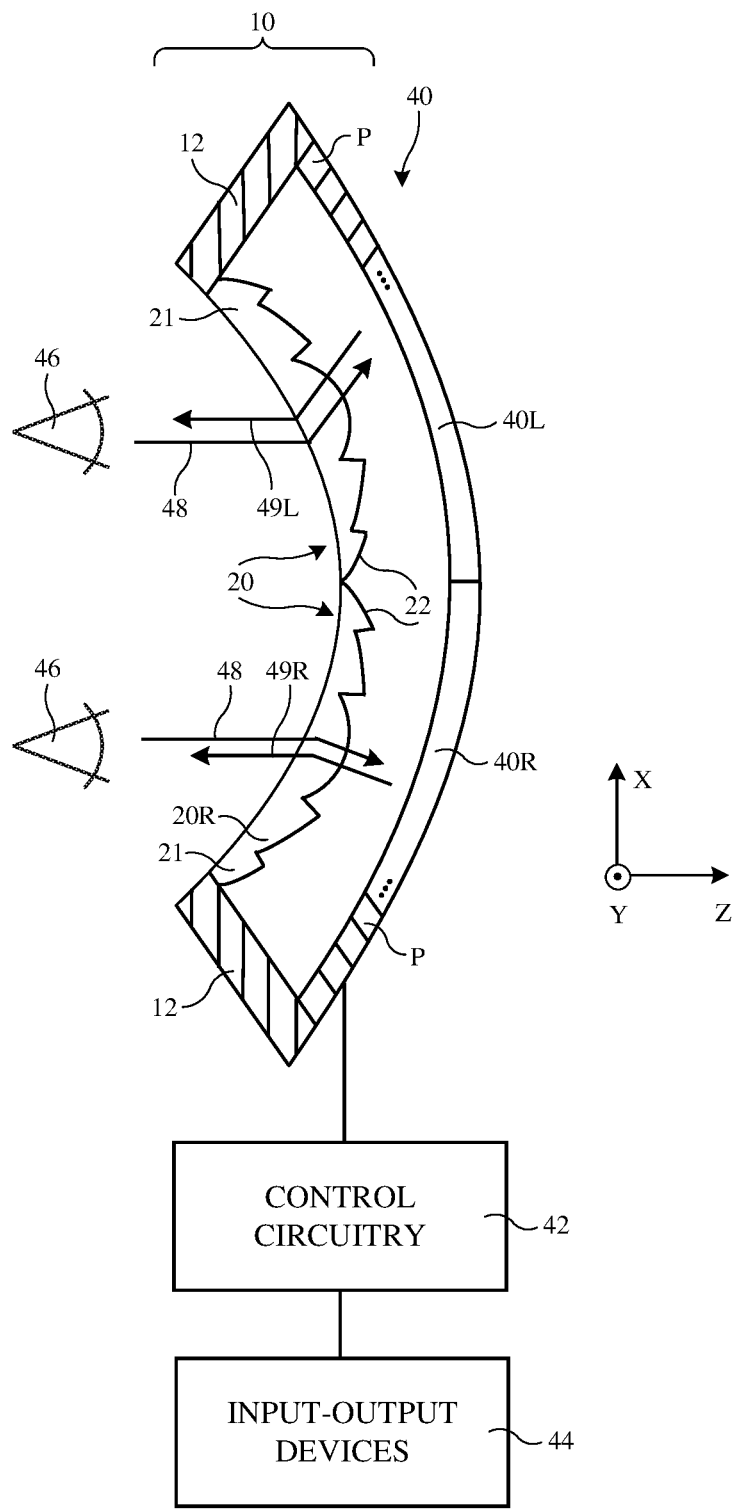
FIG. 1 is a diagram of an illustrative head-mounted device in accordance with an embodiment.

An illustrative system in which a head-mounted device such as a pair of virtual reality glasses or other device is used in providing a user with virtual reality content or other content is shown in FIG. 1. As shown in FIG. 1, head-mounted display 10 may include a display system such as display system 40 that provides images comprised of image light and may have an optical system such as lens system 20 through which a user (see, e.g., user's eyes 46) may view the images produced by display system 40 in direction 48. Lens system 20 may include fixed and/or tunable lenses for focusing the images on display 40 for viewing by the user. With one illustrative configuration, which is described herein as an example, lens system 20 includes Fresnel lenses. The Fresnel lenses may have low weight, small thicknesses, and other desirable properties relative to smooth surfaced lenses so that the bulk and weight of device 10 are reduced and viewer comfort is enhanced.

Display system 40 may be based one or more displays. Each display may be a liquid crystal display, an organic light-emitting diode display (e.g., a flexible organic light-emitting display that can be curved), a display having an array of crystalline semiconductor light-emitting diode dies on a curved or plane substrate, a liquid-crystal-on-silicon display, a microelectromechanical systems (MEMs) display, and/or displays based on other display technologies. Separate left and right displays may be included in system 40 in front of a user's left and right eyes, respectively, or a single display may span both eyes.

Visual content (e.g., image data for still and/or moving images) may be provided to display system 40 using control circuitry 42 that is mounted in head-mounted device 10 and/or control circuitry that is mounted outside of head-mounted device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such as virtual reality content (e.g., computer-generated content associated with a virtual world), pre-recorded video for a movie or other media, or other images.

Input-output devices 44 may be coupled to control circuitry 42. Input-output devices 44 may be used to gather user input from a user, may be used to make measurements on the environment surrounding device 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, and sensors (e.g., force sensors, temperature sensors, magnetic sensor, accelerometers, gyroscopes, and/or other sensors for measuring orientation, position, and/or movement of glasses 10, proximity sensors, capacitive touch sensors, strain gauges, gas sensors, pressure sensors, ambient light sensors, and/or other sensors). Devices 44 can include cameras (digital image sensors) for capturing images of the user's surroundings, cameras for performing gaze detection operations by viewing eyes 46, and/or other cameras.

Optical system components such as left lens 40L and right lens 40R and display system components such as left display 40L and right display 40R for device 10 may be mounted in a housing such as housing 12. Housing 12 may have the shape of a frame for a pair of glasses (e.g., head-mounted device 10 may resemble eyeglasses), may have the shape of a helmet (e.g., head-mounted device 10 may form a helmet-mounted display), may have the shape of a pair of goggles, or may have any other suitable housing shape that allows housing 12 to be worn on the head of a user. Configurations in which housing 12 supports optical system 20 and display system 40 in front of a user's eyes (e.g., eyes 46) as the user is viewing optical system 20 and display system 40 in direction 48 may sometimes be described herein as an example. If desired, housing 12 may have other suitable configurations.

Housing 12 may be formed from plastic, metal, fiber-composite materials such as carbon-fiber materials, wood and other natural materials, glass, other materials, and/or combinations of two or more of these materials.

Displays 40L and 40R each include an array of pixels P for generating images. As shown in FIG. 1, Fresnel lenses 20L and 20R may have wedge shapes (wedge-shaped cross-sectional profiles in the horizontal X-Z plane of FIG. 1) in which the outer portions of the lenses such as outer ends 21 near the opposing left and right sides of device 10 are thicker than inner portions of the lenses such as inner ends 22. The wedge shape of lenses 20L and 20R may be produced by adding a prism to the rear of planar Fresnel lenses that do not have a wedge shape or may be provided by forming lenses 20L and 20R from unitary wedge-shaped structures. As a result of the wedge-shaped cross-sectional profile of lenses 20L and 20R, respective rays of light from displays 40L and 40R such as rays 49L and 49R bend towards the users' eyes (e.g., into alignment with the Z axis) when propagating from pixels P to eyes 46. During manual and/or automatic set-up operations, the lateral location (e.g., the locations along the X-axis of FIG. 1) of lens 20L and display 40L relative to the lateral location of lens 20R and display 40R may be adjusted to accommodate a user's interpupillary distance. Because the rays of light from the pixel arrays of displays 40L and 40R are bent and directed towards the user's eyes by wedge-shaped Fresnel lenses 20L and 20R, respectively, ends 20 of lenses 20L and 20R can be placed close to each other (e.g., when needed to accommodate a small interpupillary distance for a user) and larger displays 40L and 40R can be used without undesired placement constraints that might be present in lenses that are located directly in front of a user's eyes that don't bend light rays from displays 40L and 40R. Fresnel lenses 20L and 20R with wedge-shaped cross-sectional profiles and/or planar Fresnel lenses for device 10 may have curved outer surfaces (e.g., convex surfaces facing displays 40L and 40R) that match corresponding curved shapes for displays 40L and 40R. Displays 40L and 40R may, for example, be formed from one or more flexible display panels that are bent to wrap around the front portion of the head of the user.

Figure 2:
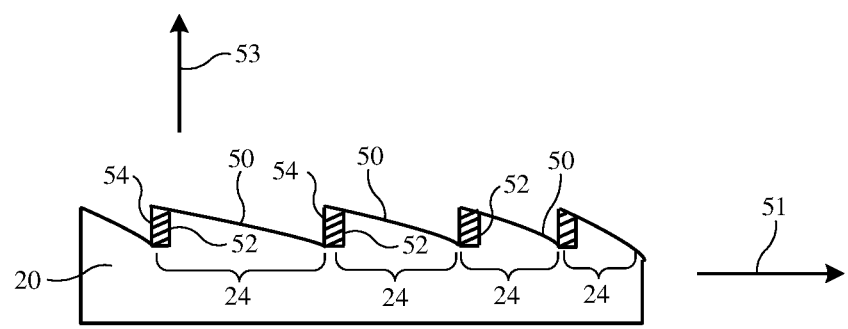
FIG. 2 is a cross-sectional side view of an illustrative Fresnel lens with draft facets that have been coated with opaque masking material in accordance with an embodiment.

A cross-sectional side view of an illustrative Fresnel lens 20 (e.g., lens 20L or lens 20R) is shown in FIG. 2. As shown in FIG. 2, lens 20 may be characterized by slope facets 50 and draft facets 52. Facets 50 and 52 are formed from the surfaces of ring-shaped Fresnel lens portions such as concentric Fresnel lens rings 24. There may be any suitable number of rings 24 in lens 20 (e.g., 50, 10-100, at least 5, at least 10, at least 15, at least 20, at least 30, at least 45, at least 75, fewer than 200, fewer than 150, or other suitable number). Slope facets 50 have a curved lens-shaped profile and exhibit relatively small angles (e.g., less than 45°, less than 30°, less than 20°, 0-20°, 0-30°, 0-40°, at least 2°, etc.) with respect to lateral dimensions such as dimension 51 (e.g., a lateral dimension in a plane aligned with the surface of lens 20 that is facing display 40). Draft facets 52, which may have straight cross-sectional profiles, typically have relatively small angles (e.g., 2°) with respect to vertical dimension 53 (e.g., a vertical dimension that is normal to the plane of the surface of lens 20 and that is therefore orthogonal to dimension 51 can be referred to as the optical axis of the lens). Because of these orientations, draft facets 52 may sometimes be referred to as vertically extending facets and slope facets 50 may sometimes be referred to as horizontally extending or laterally extending facets wherein the angle is typically <45 degrees from the plane of the lens.

During operation, light propagates from display 40 through lens 20. The rays of light from display 40 may make glancing contact with draft facets 52, which can lead to undesirable light scattering, which decreases image contrast. To reduce light scattering and thereby enhance lens performance, an opaque masking material or other absorptive masking material 54 may be formed as a coating on some or all of draft facets 52 while leaving slope facets 50 uncovered by opaque masking material 54. In this way, light passing through slope facets 50 may be focused by the shape of facets 50 and light incident on draft facets 52 may be absorbed by opaque material 54 without scattering from facets 52.

Any suitable technique may be used for forming opaque masking material 54 on facets 52. Material 54 may be, for example, a polymer with dark particles such as a black ink formed from a polymer binder and carbon black particles, other black pigment, and/or black dye. Other types of dyes and pigments and/or other binders may be used in forming opaque masking material 54, if desired. Material 54 may also be formed from metal layers and/or other opaque masking structures. If desired, polymer binder for material 54 may be photosensitive to facilitate patterning by light exposure (photo-patterning). With photo-patterning, a blanket film of material 54 (e.g., positive photoresist) may be deposited over the surface of lens 20 that contains facets 52 and 50 followed by exposure to ultraviolet light (or other suitable light) and development. The light that is applied to the photosensitive material will be absorbed by the photosensitive material on slope facets 50 but will be self-shadowed by the very high incident angle of draft facets 52 relative to the light. As a result, the more exposed material on slope facets 50 will be removed following development and only the shadowed and therefore less exposed material (draft facet material 54 of FIG. 2) will remain following development.

If desired, other fabrication techniques may be used to selectively apply opaque masking material 54 to draft facets 52. For example, pad printing, needle dispensing, ink-jet printing, or other material application techniques may be used to selectively apply material 54 to facets 52. Facets 52 and facets 50 may also be coated with a blanket layer of material 54 that is subsequently selectively removed from facets 50 (e.g., using laser removal techniques, machining techniques, chemical treatment, etc.). With another illustrative approach, electrostatic charge may be selectively written onto facets 52 using a charged electrode (e.g., a probe with a narrow tip or other electrode structure) or by selectively rubbing facets 52 to generate charge so that charged material 54 will selectively be attracted to facets 52 during electrostatic printing operations. Material can also be selectively removed from facets 50 by spraying or otherwise selectively applying a release coating onto facets 50 without coating facets 52. With this type of configuration, a blanket layer of material 54 that is applied over the face of lens 20 can be selectively released from facets 50 to leave facets 52 covered with material 54.

Figure 3:
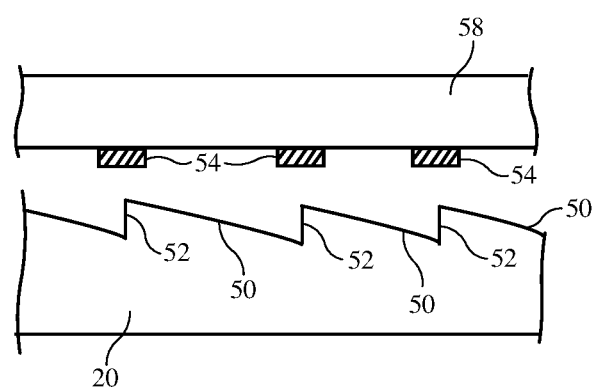
FIG. 3 is a cross-sectional side view of an illustrative Fresnel lens and associated mask formed from concentric rings of opaque masking material aligned with draft facets in the Fresnel lens to prevent the draft facets from scattering light in accordance with an embodiment.

As shown in FIG. 3, light scattering from draft facets 52 may be reduced by blocking facets 52 from exposure to image light using patterned masking material 54 on a separate substrate such as substrate 58. Patterned masking material 54 may, for example, form a series of concentric rings that are each aligned with a respective concentric ring-shaped draft facet 52 in lens 20. Lens 20 and/or substrate 58 may be formed from transparent glass, clear plastic (e.g., transparent molded or machined plastic), and/or other transparent materials. Substrate 58 (and lens 20) may have planar shapes and/or substrate 58 and/or lens 20 may have curved surfaces (e.g., curved cross-sectional profile shapes that match a curved shape for a wrap-around display such as display 40 of FIG. 1). Material 54 may be patterned by photolithography, shadow mask deposition, machining, laser patterning, selective printing, and/or other suitable mask formation techniques. When assembled into housing 12, the mask structure formed from substrate 58 and patterned opaque masking material 54 may block light from display 40 that would otherwise strike draft facets 52, thereby reducing light scattering in lens 20. By positioning the mask structure relatively close to the user's eye 46 the patterned opaque masking material 54 will not degrade the image quality perceived by the user other than to slightly reduce the brightness of the image.

Figure 4:
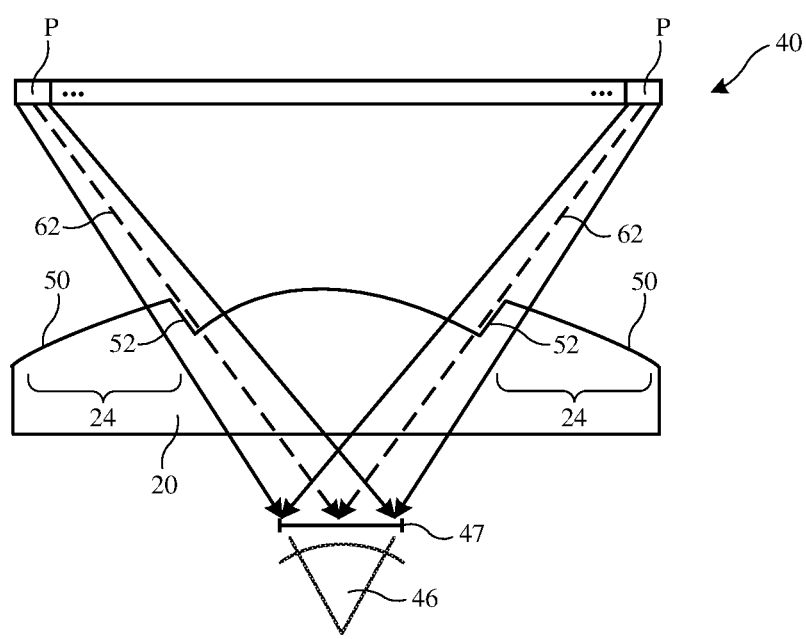
FIG. 4 is a cross-sectional side view of an illustrative Fresnel lens having draft facet surfaces that are aligned with and parallel to chief rays in a head-mounted device in accordance with an embodiment.

FIG. 4 shows an example of how draft facets 52 may be designed to reduce scattering and thereby increase image contrast. Image light provided by pixels P in display 40 (e.g., a left of right display) pass through lens 20 (e.g., a left or right Fresnel lens) and is viewed as an image by user's eye 46, which is located in eyebox 47 wherein the image is viewable. Chief rays 62 comprise central rays within the cone of image light provided by each pixel and as such, the chief rays pass from the pixels P to the center of eyebox 47. As the image light passes through a Fresnel lens, the slope facets provide the intended function of the lens by focusing the image light at the eyebox 47. At the same time, image light can be scattered by the draft facets because the image light is defocused and redirected away from the eyebox 47. In an embodiment, scattering of the image light by the draft facets 52 can be reduced by aligning at least some of the surfaces of draft facets 52 so that they are parallel to chief rays 62. Because the angle of the chief rays varies radially from the optical axis of the lens, in a preferred embodiment the angle of the draft facets in lens 20 is varied radially in correspondence to the local angle of the chief ray, and as a result draft facets near the optical axis of the lens can have a small angle (e.g. 2 degree) while draft facets near the edge of the lens have a larger angle (e.g. at least 10 degrees). However, in some lens designs such as a freeform lens, the angle associated with the chief rays of the image light may vary nonlinearly with position across the lens and the draft facet angles will need to be varied in correspondence.

Figure 5:
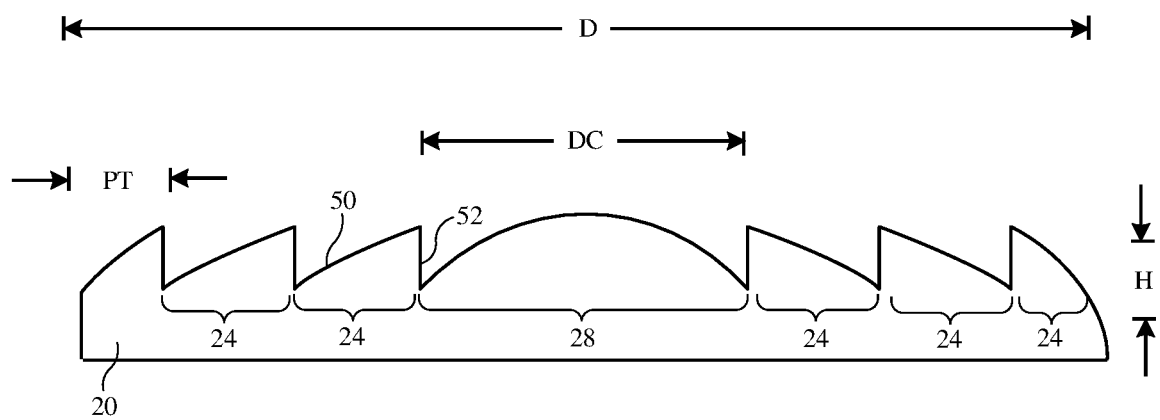
FIG. 5 is a cross-sectional side view of an illustrative Fresnel lens with a dome-shaped central region in accordance with an embodiment.

As shown in FIG. 5, lens 20 can be a hybrid lens, comprised of an outer Fresnel portion that includes concentric rings 24 with slope facets 50 and draft facets 52 that surround a smooth dome-shaped central portion that is free of rings and facets such as lens portion 28 where dome portion 28 is designed to provide a focal plane that is coplanar to the focal plane associated with the Fresnel portion that has concentric rings and facets. Typically this requires that the dome portion 28 have a different base curvature than the outer Fresnel portion as shown in FIG. 5 where the dome portion 28 is more curved than the outer Fresnel portion where the concentric rings 24 are shown with a planar base curve. Because dome portion 28 is free of facets, light scattering may be reduced in dome portion 28 relative to the portions of lens 20 that contain rings 24. To help reduce overall light scattering in lens 20, the fraction of the diameter of lens 20 that is occupied by dome portion 28 can be enlarged (e.g., the ratio of dome portion diameter DC to lens diameter D) may be at least 20%, at least 30%, at least 40%, at least 50%, at least 60%, less than 80% or other suitable fraction. In a preferred embodiment, the dome portion of the lens and the Fresnel portion of the lens are designed to provide a smooth optical transition to insure that the viewing experience is uninterrupted as the user's eye moves to view different portions of the displayed image, where the smooth optical transition can be provided by matching field curvatures between the dome portion 28 and the Fresnel portion to within 0.5 diopters and matching distortion within 1% of each other. For configurations of Fresnel lens 20 that do not have circular outlines, diameter D may be taken as the largest lateral dimension of lens 20 and diameter DC may be taken as the largest lateral dimension of central dome portion 28. Characterized in another way, the diameter of portion 28 may be at least 10 times, at least 20 times, fewer than 100 times, 5-100 times, or other suitable number of times greater than the width of the innermost of rings 24 and/or diameter DC may be configured to fall outside of an angular range of +/−300 with respect to a ray passing through the center of eyebox 47.

The rings of lens 20 may have a constant height arrangement in which each of rings 24 has a common height H, may have a constant width arrangement in which each of rings 24 has a common width PT, and/or may have a configuration in which some or all of ring heights H and/or some or all of ring widths W differ from each other. Dome portion 28 may have a height that matches height H of rings 24 or that differs from that of rings 24 (e.g., the height of dome portion 28 may be greater than H).

Figure 6:
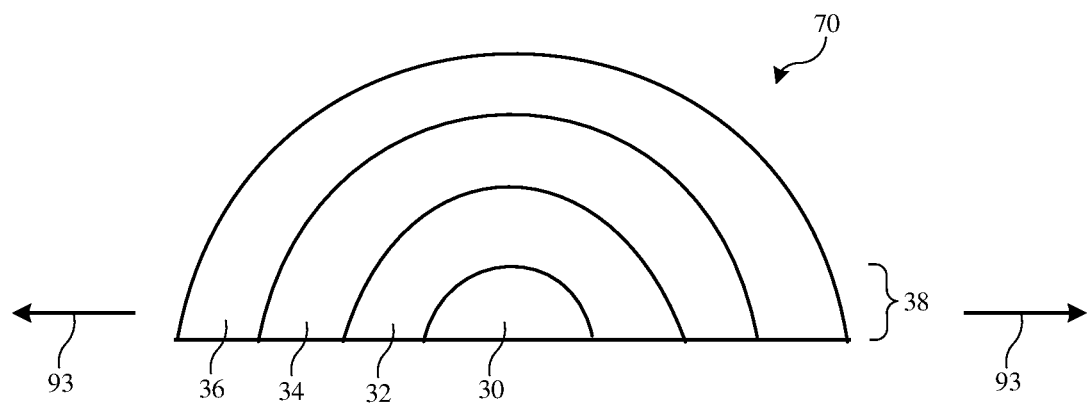
FIG. 6 is a cross-sectional side view of an illustrative gradient-index material of the type that may be used in forming lenses in accordance with an embodiment.

If desired, a gradient-index material, comprised of material that has a laterally or radially varying refractive index, may be used in forming lens 20. Consider, as an example, the arrangement of FIG. 6. As shown in FIG. 6, gradient-index-of-refraction material 70 may be formed from multiple bent layers of glass, plastic, and/or other transparent material such as layers 30, 32, 34, and 36. There may be any suitable number of layers (e.g., 2-100, at least 5, at least 25, at least 100, fewer than 500, fewer than 100, fewer than 30, etc.) in structure 70. The example of FIG. 6 is illustrative The index of refraction of the layers in the structure of FIG. 6 may decrease progressively as a function of distance outward in directions 93 from inner layer 30. For example, layer 30 may have a refractive index of 1.5, layer 32 may have a refractive index of 1.45, layer 34 may have a refractive index of 1.40, and layer 36 may have a refractive index of 1.35 (as an example). Material 70 of FIG. 6 may be formed by laminating multiple layers of material of different refractive indices together and bending these layers under heat and/or pressure (as an example). Lens 20 may then be formed from lower portion 38 of material 70 (e.g., by machining). A Fresnel lens 20 formed from gradient-index material 70 in this way is shown in FIG. 7.

Figure 7:
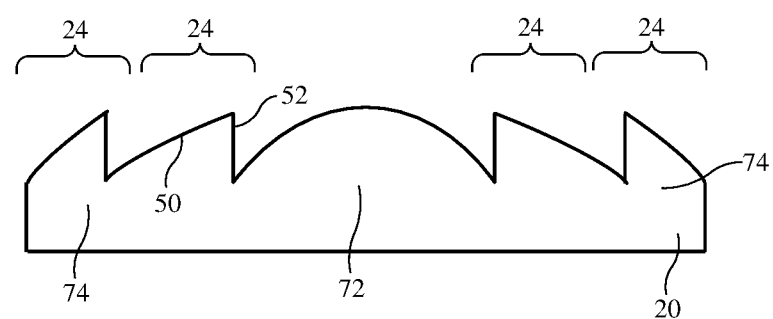
FIG. 7 is a cross-sectional side view of an illustrative Fresnel lens of the type that may be formed using the gradient-index material of FIG. 6 in accordance with an embodiment.

As shown in FIG. 7, lens 20 may have central portions such as portions 72 and peripheral (edge) portions such as portions 74. When a gradient-index material is used in forming lens 20, central portion 72 will have a higher index of refraction (e.g., n=1.5) than peripheral portions 74 (e.g., n=1.35). The gradient-index material may also be comprised of alternate layers of at least two materials with different refractive index, where the at least two materials can be birefringent so that the refractive index through the thickness of the layer is different from the refractive index within the layer, and the layers are oriented at different angles across a lateral dimension of the lens 20. Between portions 72 and 74, the index of refraction of lens 20 may vary progressively as described in connection with portion 38 of gradient-index material 70 of FIG. 6. Index discontinuities can be minimized by using numerous thin layers in forming gradient-index material 70. The use of gradient-index material 70 in forming Fresnel lens 20 of FIG. 7 allows the strength of the Fresnel structures in lens 20 (e.g., the slope of the slope facets and therefore the heights H of rings 24 of a given width) to be reduced relative to a Fresnel lens formed from a material with a uniform index of refraction. This helps allow lens thickness to be reduced, allows draft facet scattering to be reduced by widening rings 24 for a given height H, etc. Gradient-index configurations for lens 20 may be used for planar Fresnel lens shapes, curved Fresnel lens shapes, wedge-shaped Fresnel lenses (with curved and/or planar outer surfaces facing display 40), and/or other suitable Fresnel lenses for device 10. Non-Fresnel lenses 20 that are formed from gradient-index material 70 may also be used in device 10, if desired.

Figure 8:
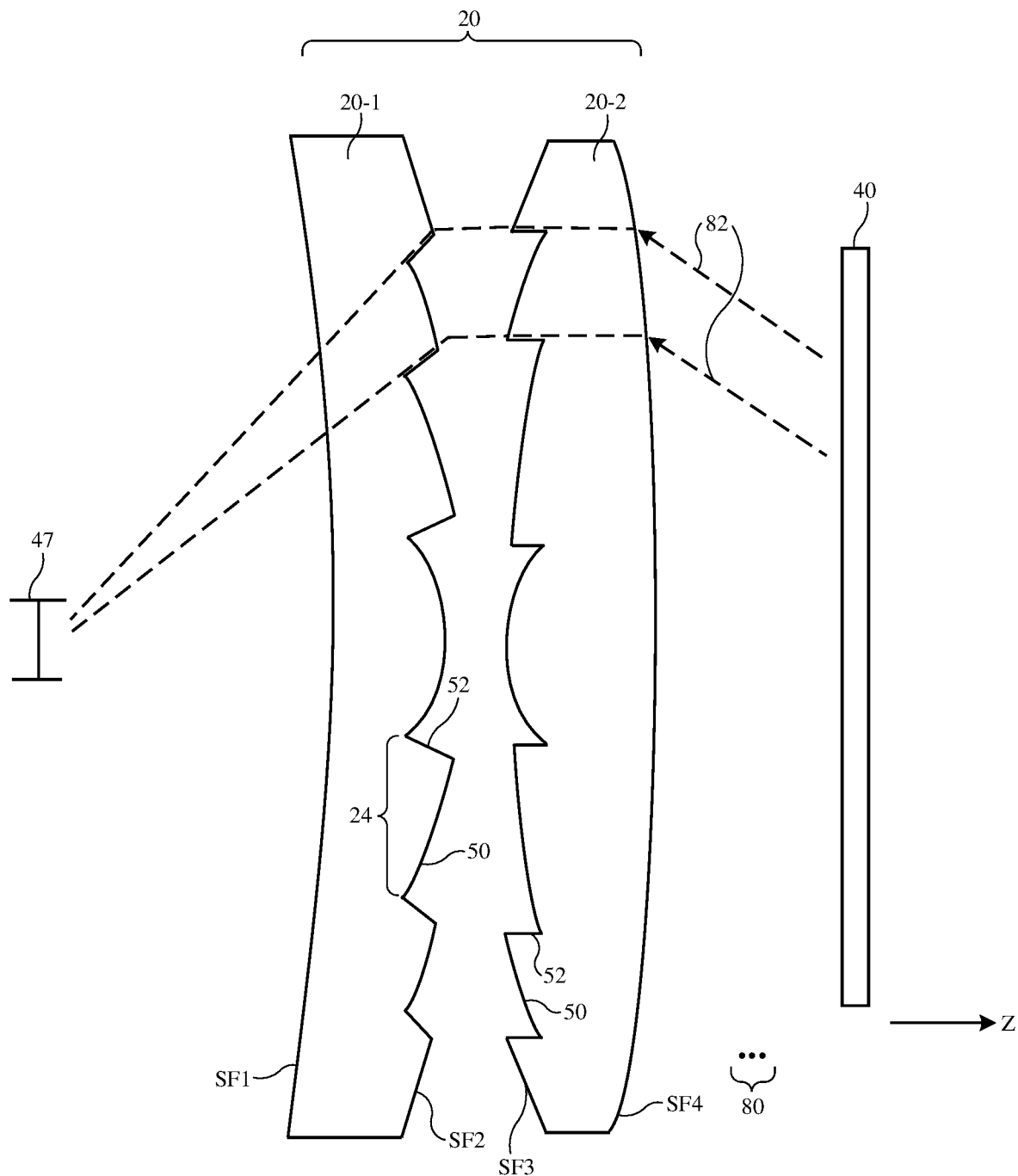
FIG. 8 is a diagram of an illustrative Fresnel lens with two elements in accordance with an embodiment.

FIG. 8 is a diagram of an illustrative configuration for lens 20 in which lens 20 has two elements: inner lens 20-1 and outer lens 20-2. Lens 20-1 and/or lens 20-2 may be Fresnel lenses and/or other suitable lenses. In the example of FIG. 8, lens 20-1 has Fresnel lens rings (facets) 24 on outer (outwardly facing) surface SF2, but not on inner (inwardly facing) surface SFL. If desired, both surfaces SF1 and SF2 or only surface SF1 may have Fresnel lens facets. In the example of FIG. 8, lens 20-2 has Fresnel lens rings (facets) 24 on inner (inwardly facing) surface SF3, but not on outward (outwardly facing) surface SF4. If desired, both surfaces SF3 and SF4 or only surface SF4 may have Fresnel lens facets. Lens 20 may also have one or more additional lens elements (e.g., one-sided and/or two-sided Fresnel lenses, lenses with smooth surfaces, etc.), as indicated by dots 80.

To help minimize light scattering, lens 20 may be configured so that the light that illuminates a given Fresnel lens ring 24 on lens 24-2 evenly illuminates a corresponding Fresnel lens ring 24 on lens 24-1, as illustrated by rays 82. With this type of arrangement, there are an equal number of Fresnel lens rings (facets) on outer lens 20-2 and inner lens 20-1. This one-to-one correspondence between the Fresnel lens rings on lens 20-1 and the Fresnel lens rings on lens 20-2 (the equal number of Fresnel rings on these two lens elements) helps reduce scattering and enhance lens performance.

Draft facets 52 in lens 20-1 may have surfaces that are aligned with and parallel to chief rays as described in connection with FIG. 4. In an illustrative embodiment, draft facets 52 in lens 20-2 are horizontal (parallel to the Z axis) to facilitate release of lens 20-2 (e.g., a polymer lens) from a mold. Other configurations for the facets of lenses 20-1 and 20-2 may be used, if desired.

Lens 20 may be a single element lens or a multielement lens. Multielement lenses may, for example, have inner and outer lens elements as shown in FIG. 8. Two-element lenses such as these may sometimes be referred to as two-element objectives and may be formed using any suitable objective configuration (e.g., a Petzval objective configuration with two positive lenses, a telephoto objective configuration with a positive inner lens and negative outer lens, or a reverse telephoto objective configuration with a negative inner lens and a positive outer lens). The center smooth portion of the Fresnel lens surface used in lens 20 may be relatively large as described in connection with FIG. 5. Draft facet masking techniques may also be used in lens 20 to help reduce scattering. As the example of FIG. 8 demonstrates, lens 20 may have a meniscus Fresnel lens design (e.g., with a hybrid Fresnel configuration having an enlarged smooth center portion) that has an inner lens with Fresnel lens structures on its convex surface and an outer lens with Fresnel lens structures on an opposing concave surface. Other arrangements may be used for lens 20, if desired.

Figure 9:
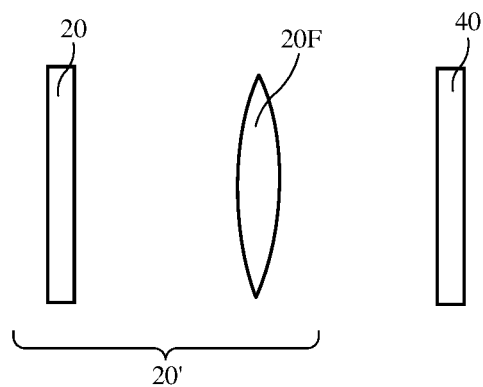
FIGS. 9 and 10 are diagrams showing illustrative field lenses used in conjunction with Fresnel lenses in accordance with an embodiment.
Figure 10:
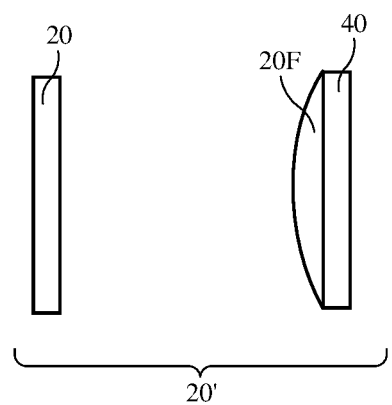

As shown in FIGS. 9 and 10, device 10 may have lenses such as lens 20' of FIG. 9 that each include a lens 20 (e.g., a single-element objective or a multi-element objective) and that each include a field lens (e.g., field lens 20F) interposed between display 40 and lens 20. Display 40 may be flat or curved. In the FIG. 9 example, field lens 20F is a biconvex lens. In the FIG. 10 example, field lens 20F of lens 20' is a plano-convex lens that is attached to the planar front surface of display 20. Other field lens configurations may be used, if desired.

The foregoing is merely illustrative and various modifications can be made to the described embodiments. The foregoing embodiments may be implemented individually or in any combination.

What is claimed is:

1. A lens having a maximum lateral dimension with opposing first and second ends, comprising:
   a center dome portion; and
   an outer Fresnel lens portion that radially surrounds the center dome portion and that has slope facets and draft facets, wherein the draft facets are coated with absorptive material, wherein the slope facets are free of the absorptive material, and wherein the center dome portion and the outer Fresnel lens portion have a wedge shaped cross-sectional profile in which the outer Fresnel lens portion has a first thickness at the first end of the maximum lateral dimension of the lens and a second thickness at the second end of the maximum lateral dimension of the lens, the first thickness being greater than the second thickness.

2. The lens defined in claim 1 wherein the center dome portion and the Fresnel lens portion are formed from a gradient-index-of-refraction material.

3. The lens defined in claim 2 wherein the draft facets have an angle that varies radially across the Fresnel lens.

4. The lens defined in claim 1, wherein the outer Fresnel lens portion comprises a first outer Fresnel lens portion that forms the first end of the maximum lateral dimension and a second outer Fresnel lens that forms the second end of the maximum lateral dimension, wherein the center dome portion is laterally interposed between the first and second outer Fresnel lens portions.

5. A device, comprising:
   a display including pixels configured to display images;
   a Fresnel lens through which the images are viewable; and
   a housing configured to support the display and the Fresnel lens, wherein the Fresnel lens has an inner Fresnel lens element and an outer Fresnel lens element, wherein the inner Fresnel lens element has first Fresnel lens rings, wherein the outer Fresnel lens element has second Fresnel lens rings, wherein the first Fresnel lens rings of the inner Fresnel lens element face the second Fresnel lens rings of the outer Fresnel lens element, wherein the inner Fresnel lens element has a concave surface opposite the first Fresnel lens rings, and wherein the outer Fresnel lens element has a convex surface opposite the second Fresnel lens rings.

6. The device defined in claim 5 wherein the inner Fresnel lens element and the outer Fresnel lens element have an equal number of Fresnel lens rings.

7. The device defined in claim 5 wherein the first Fresnel lens rings of the inner Fresnel lens element have slope facets that are free of absorptive masking material and have draft facets covered with absorptive masking material.

8. The device defined in claim 5 wherein the first Fresnel lens rings of the inner Fresnel lens element have first draft facets with surfaces parallel to chief rays, and wherein the second Fresnel lens rings of the outer Fresnel lens element have second draft facets, each of the second draft facets being parallel to each other and non-parallel with respect to the first draft facets.

9. The device defined in claim 5 wherein the Fresnel lens has a diameter, wherein the inner and outer Fresnel lens elements each have a central dome portion without Fresnel lens rings and an outer portion with Fresnel lens rings, and wherein the central dome portion of the inner and outer Fresnel lens elements has a diameter of at least 20% of the diameter of the lens.

10. The device defined in claim 5 further comprising a field lens interposed between the display and the Fresnel lens.

* * * * *